No. 867,246. PATENTED OCT. 1, 1907.
E. W. COOKE.
DEHYDRATING APPARATUS.
APPLICATION FILED JAN. 29, 1904.
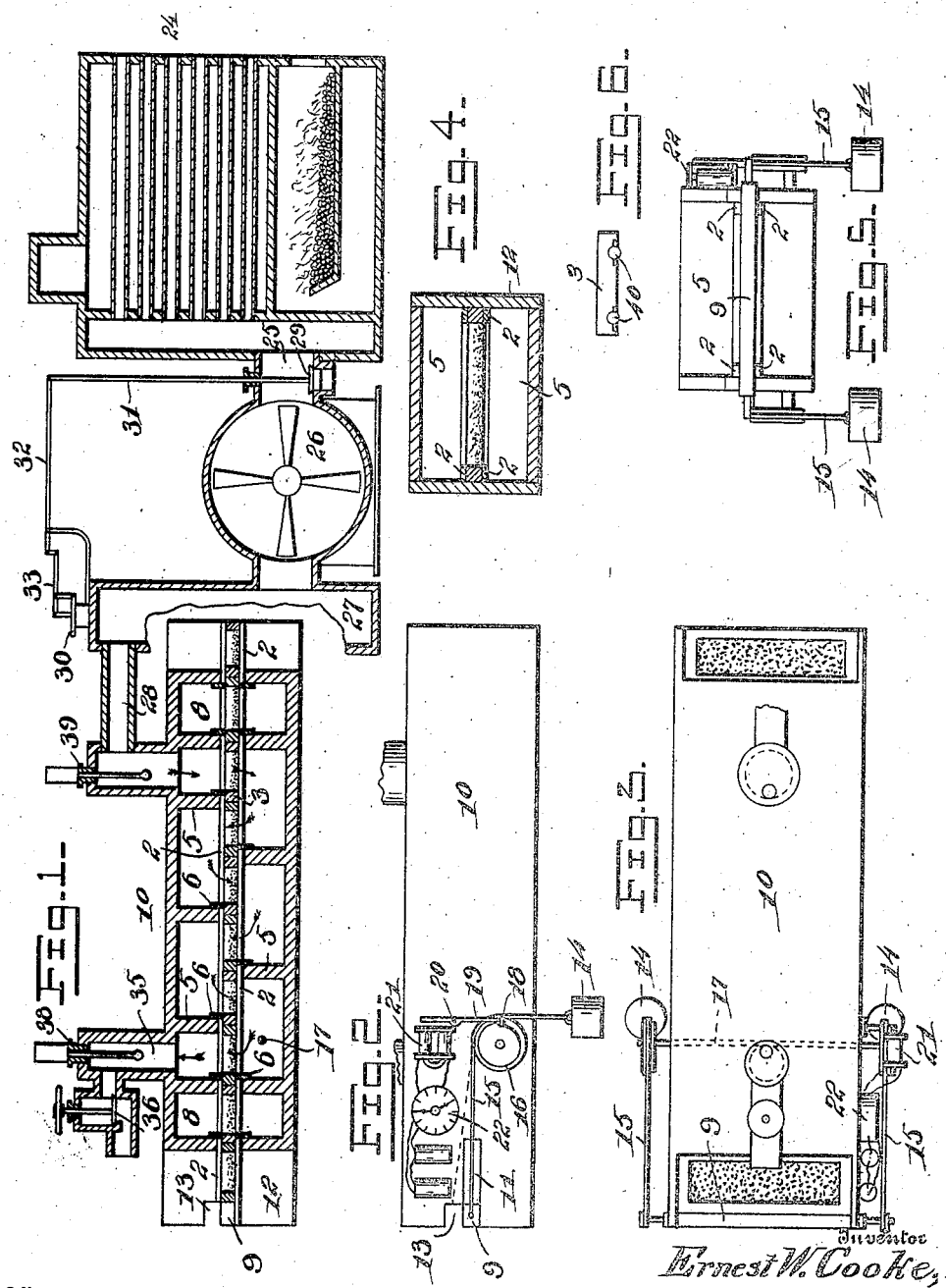
Witnesses
L. Armstrong
J. B. Roman
Inventor
Ernest W. Cooke,
By Howard L. Coombe
his Attorney

UNITED STATES PATENT OFFICE.

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

DEHYDRATING APPARATUS.

No. 867,246.  Specification of Letters Patent.  Patented Oct. 1, 1907.

Application filed January 29, 1904. Serial No. 191,658.

*To all whom it may concern:*

Be it known that I, ERNEST WILLIAM COOKE, a citizen of the United States of America, residing at New York city, in the county of New York and State of New York, have invented new and useful Improvements in Dehydrating Apparatus, of which the following is a specification.

My invention relates to dehydrating apparatus, and is especially designed for the treatment of food products, both animal and vegetable, whereby they are thoroughly dehydrated, while at the same time maintaining their cellular structure and chemical composition unimpaired, so that they can be perfectly restored to their original undehydrated condition by the simple addition of water.

It is essential that the apparatus be constructed and operated so as to bring the fresh material, preferably in a more or less finely divided state, into contact first, with air which has already passed through previous portions of the same or other material, whereby it has already absorbed some moisture and become somewhat cooled, and gradually subject said material to the action of air which is progressively more and more dry and of a higher temperature until finally it comes in contact with air of the initial dryness and temperature. It is also necessary in the treatment of some delicate substances, to provide means to retard the egress of the air from the apparatus, whereby a certain pressure is set up, which causes the air to thoroughly permeate every part of the material being treated, prevents any injury to the cellular structure thereof and thoroughly dehydrates the same.

My improved apparatus comprises in general a dehydrating chamber, means to dry air, means to force the same into one end of said chamber, means to convey the products to be treated through said chamber in the opposite direction to the air and means to control the egress of the air.

Further details of construction and of certain mechanisms I may use to render the operation more nearly automatic will be referred to in the detailed description which follows, reference being had to the accompanying sheet of drawing, in which Figure 1 is a central vertical section through the dehydrating chamber, showing also in section means for supplying, and controlling the supply of, the dry air; Fig. 2 is a diagrammatic side elevation of the chamber illustrating an arrangement of mechanism for automatically feeding the material into said chamber at predetermined intervals of time; Fig. 3 is a plan view of the chamber; Fig. 4 is a cross section of the same; Fig. 5 is an end view looking from the left in Figs. 2 and 3, and Fig. 6 illustrates a modified form of tray for carrying the material.

In these views 10 represents the dehydrating chamber as a whole, provided with lateral guideways 2, 2 for the trays 3. In the chamber are transverse partitions 5 extending alternately from the top and bottom to said guideways and provided on their free ends with flexible packing material 6 adapted to contact with the ends of the trays 3, as indicated in Fig. 1, to form a practically air tight stop. The distance between a pair of adjacent partitions, one extending downwardly and one upwardly is equal to the length of one tray, as shown, but it may be equal to the length of two or more trays. It is only essential that the said distance shall be equal to an integral multiple of the length of the trays, so that by moving the trays an amount equal to the length of one of them, the adjacent ends of two trays will be brought in line with each partition.

At each end of the chamber is a sealing compartment 8, through which the air does not pass. The guides 2 extend outside said sealing compartments, and each time the trays are moved forward a fresh tray enters one sealing compartment, and a tray with dehydrated material comes out of the other compartment.

As a means for feeding the trays I have shown a pusher-bar 9, which slides in slots 11 formed in the side-walls 12 of the chamber, said walls extending outside the sealing compartments, as shown. A notch 13 is formed in said walls to permit the bar 9 to be raised when a fresh tray is placed in the guides 2. The bar is then dropped down behind said tray and may be moved forward by means automatically operating at certain periods of time. I have illustrated such means as consisting of weights 14 connected by cords 15 to the pusher bar, said cords being wound around drums 16, fast on a shaft 17, passing transversely through the walls of the chamber 10. One of said drums is provided with a catch shoulder 18, with which coöperates, to prevent said drums from rotating, a latch lever 19, pivoted at 20.

An electro-magnet 21, the circuit of which is controlled by a time-mechanism 22, is arranged, when energized, to attract the upper end of the lever 19 and remove the lower end from the catch shoulder 18. The weights then act to draw the pusher bar forward and feed a fresh tray in, a tray at the other end of the chamber being thereby simultaneously fed out of the chamber.

The bar is then drawn back by hand and raised into the notch 13, another tray is placed in the guides 2 and the bar dropped behind the same. Then when the given period of time has elapsed, that tray will be automatically fed in and the other trays all advanced one step.

Of course, other mechanism may be constructed to perform the result just described, my invention in this respect being broadly the provision of automatic means to periodically move the trays into and through the dehydrating chamber.

At 24 I have shown conventionally an air drier, which may be of any suitable construction. The dried and heated air is drawn from said drier, through a pipe 25, by a fan or blower 26, which delivers the air into a mixing-box 27, from which it passes through a pipe 28 into the chamber 10.

It is essential, for the proper treatment of any particular material being dehydrated, that the temperature and humidity of the air should be readily controllable, and in this instance I accomplish that end by providing means for mixing air taken directly from the atmosphere with the air coming from the drier. While the admission of the outside air may be performed and controlled by hand, I prefer to regulate its admission automatically, so that the temperature and humidity of the air mixture delivered into the dehydrated chamber will be maintained constant, within certain limits, during the treatment of any given material. The means shown for obtaining this result consist of a valve 29 arranged to admit outside air into the pipe 25, and connected by a rod 31 and levers 32 and 33 to a thermostat 30 in the mixing box 27. The thermostat being adjusted for certain temperatures, the valve 29 will be automatically opened as soon as the maximum temperature is reached and closed again when the temperature in the mixing box drops to the minimum temperature required for the particular material being treated.

Other forms of automatic controlling devices may be employed in place of that just described, and the valve 29 may admit air which has been artificially cooled or dried, or both, but the arrangement shown is simple and convenient and will serve to illustrate the principle of my invention in this regard.

The trays 3, instead of sliding on the guides 2, may be provided with wheels or rollers 40, as shown in Fig. 6.

The egress of the air from the chamber 10 is through piping, such as shown at 38, and is controlled by a valve 36. This valve is only opened sufficiently to permit a constant circulation of air through the material being treated, but at the same time to retard the flow of the current of air, whereby the same is maintained under a certain pressure, which varies with different products, but which is an essential feature with most products in order that the same may be thoroughly dehydrated without injury to their delicate structure.

Thermometers are provided, as shown at 38 and 39, that the temperature of the air, as it enters the chamber 10 and as it leaves the same, may be known.

Having thus described my invention what I claim and desire to secure by Letters Patent of the United States is:

1. In a dehydrating apparatus, a chamber provided with guideways for trays to carry the material to be treated, transverse partitions extending alternately downwardly from the top and upwardly from the bottom of said chamber toward said guideways, flexible packing strips on the free ends of said partitions arranged to contact with the ends of said trays and means to force air through said chamber, whereby when the ends of pairs of adjacent trays are in line with said partitions, the air is caused to pass in a sinuous path upwardly through the material on one tray and downwardly through the material on the next adjacent tray.

2. In a dehydrating apparatus, a chamber provided at its sides with longitudinal guideways, carrying-trays movable on said guideways, transverse partitions extending alternately downwardly from the top of said chamber and upwardly from the bottom of said chamber to points adjacent to said guideways, means to force air through said chamber and automatic means to intermittently move said carrying-trays through said casing.

3. In a dehydrating apparatus, a chamber provided at its sides with longitudinal guideways, carrying trays movable on said guideways, transverse partitions extending alternately downwardly from the top and upwardly from the bottom of said chamber to points adjacent to said guideways, means to force air into one end of said chamber, means to feed said carrying-trays into the other end of said chamber and means to control the egress of the air at said last mentioned end.

4. In a dehydrating apparatus, a chamber provided at its sides with longitudinal guideways adapted to support carrying-trays for the material to be treated, transverse partitions extending alternately downwardly from the top and upwardly from the bottom of said chamber to points adjacent to said guideways, a sealing compartment at each end of said chamber provided with apertures for the passage of the trays, flexible strips of packing material on the free ends of said partitions and on the edges of said apertures and means to force air through said chamber.

5. In a dehydrating apparatus, a chamber provided with guideways adapted to support and guide trays for carrying the material to be treated, transverse partitions extending inwardly from two opposite walls of said chamber to points adjacent to said guideways, each partition extending from one of said walls being located substantially midway between a pair of partitions extending from the other wall, flexible strips of packing material on the free ends of said partitions, means to force air into one end of said chamber and means to control the egress of the air from the other end of said chamber.

6. In a dehydrating apparatus, a chamber provided with guideways adapted to support and guide trays for carrying the material to be treated, transverse partitions extending inwardly from two opposite walls of said chamber to points adjacent to said guideways, each partition extending from one of said walls being located substantially midway between a pair of partitions extending from the other of said walls, means to progressively move the carrying-trays from one end of said chamber to the other, means to force air into said chamber at the last mentioned end and means to control the egress of the air from said chamber.

7. In a dehydrating apparatus a chamber provided internally with guideways adapted to support and guide trays for carrying the material to be treated, transverse partitions extending inwardly from the walls of said chamber to points adjacent to said guideways, sealing compartments at the ends of said chamber, strips of flexible material on the free ends of said partitions adapted to contact with the trays as they pass along on said guideways, means at one end of said chamber to intermittently feed the trays through the sealing compartments and into the chamber and means to force air into the other end of said chamber.

8. In a dehydrating apparatus, a chamber provided with longitudinal guideways, carrying-trays and means to feed the same along said guideways in a continuous series, means to force air into one end of said chamber, a valve to control the egress of the air from the other end of said chamber, and means within said chamber to cause the air in its passage therethrough to pass alternately from one side of said series of carrying-trays to the other.

9. In a dehydrating apparatus, a four-sided chamber provided with longitudinal guideways located at substantially the center of two opposite sides, transverse partitions extending inwardly from the two other sides of said chamber to points adjacent to said guideways, the partitions on one of said sides being staggered with relation to the partitions on the other of said sides, means to feed carrying trays along said guideways, sealing compartments at the opposite ends of the chamber provided with apertures for the ingress and egress of the carrying-trays, means to force air into said chamber and a valve to control the egress of the air from said chamber.

10. In a dehydrating apparatus, a chamber provided with longitudinal guideways carrying trays slidably mounted on said guideways, means to feed said trays through said chamber in a continuous series in one direction, means to force air through said chamber in the other direction and means within said chamber adapted to coöperate with the said trays to cause the air in its passage therethrough to pass alternately from one side of said carrying-trays to the other.

11. In a dehydrating apparatus, the combination with a chamber, of means to pass heated air therethrough, comprising a furnace, a blower, a pipe connecting said furnace to said blower and a mixing box between said blower and said chamber, a valve to admit cold air into the pipe between the furnace and the blower, and a thermostat connected with said mixing box leading from the blower to the chamber and connected to said valve whereby the temperature of the air forced into said chamber will be automatically regulated.

12. In a dehydrating apparatus, the combination with a four-sided chamber provided at the centers of two opposite sides with longitudinal guideways, transverse partitions extending inwardly from the other two opposite sides of said chamber to points adjacent to said guideways, the said partitions on one side being staggered with reference to the partitions on the opposite side, carrying-trays for the material to be treated adapted to be movably mounted on said guideways, the distance between adjacent partitions on the same side of said guideways being a multiple of the length of said trays, and means to feed said trays on said guideways at predetermined intervals of time a distance which is also an integral multiple of the length of said trays.

13. In a dehydrating apparatus, the combination with a chamber, of means to force heated air thereinto, comprising a furnace, a blower, a pipe connecting said furnace to said blower, and a mixing compartment between said blower and said chamber, a valve to admit cold air into the pipe between the furnace and the blower, a thermostat located in the mixing compartment and connected to said valve, whereby the temperature of the air forced into said chamber will be automatically regulated, and a valve for controlling the escape of the air from said chamber, whereby the pressure of the air within said chamber may be controlled.

14. In a dehydrating apparatus, a four-sided chamber provided at the centers of two of its opposite sides with guideways, carrying-trays adapted to slide on said guideways, transverse partitions extending inwardly from the other two opposite sides of said chamber to points adjacent to said guideways, the partitions on one side being staggered with relation to the partitions on the other side, flexible strips of packing material on the free ends of said partitions and adapted to contact with the carrying-trays, automatic means at one end of said chamber to feed trays into said chamber at regular predetermined intervals of time a distance such that the adjacent sides of each pair of trays will be brought opposite one of said partitions, means to force air through said chamber and means to control the temperature and pressure of the air.

In testimony whereof I have affixed my signature in presence of two witnesses.

ERNEST WILLIAM COOKE.

Witnesses:
H. HAUPT, Jr.,
JACOB APPELL.